United States Patent

[11] 3,584,312

[72] Inventor Hermann Statz
 Wayland, Mass.
[21] Appl. No. 867,955
[22] Filed Oct. 20, 1969
[45] Patented June 8, 1971
[73] Assignee Raytheon Company
 Lexington, Mass.
 Continuation of application Ser. No.
 546,270, Apr. 29, 1966, now abandoned.

[54] SPIKELESS SINGLE-MODE LASER
 6 Claims, 7 Drawing Figs.
[52] U.S. Cl. .................................................. 331/94.5,
  330/4.3, 250/199, 350/151
[51] Int. Cl. .............................................. H01s 3/10
[50] Field of Search ............................................ 331/94.5

[56] References Cited
 UNITED STATES PATENTS
 3,277,392 10/1966 Nicolai ........................ 331/94.5
 3,277,393 10/1966 Nicolai ........................ 331/94.5
 3,322,026 5/1967 Rigrod ......................... 331/94.5
 FOREIGN PATENTS
 1,396,034 3/1965 France ........................ H/03f
 OTHER REFERENCES
 " Low-level Garnet Limiters," F. Arams et al., Proc. Ire, 49, pp 1308— 13, August, 1961.
 " Use of Electro-Optical Shutters to Stabilize Ruby Laser Operation" F. Marshal et ux., Proc. Ire, 50, p. 2108, Oct., 1962.

" Nonlinear Optical Effects: An Optical Power Limiter," A. E Siegman, Appl. Optics, 1, (6), Nov. 1962, pp. 739— 44.
" Optical Double-Photon Absorbtion in Cesium Vapor," I. D. Abella, Phys. Rev. Lett., 9, (11), Dec. 1, 1962.
" Laser Operation Without Spikes in a Ruby Ring," P. Walsh et ux., J. Appl. Phys., 34, (4)— Part 1, Apr. 1963, pp. 956— 7.
" Nonlinear Absorbers of Light," R. W. Keyes, IBM J., 7, (4), pp. 334— 6, Oct. 1963.
" Problem of Spike Elimination in Lasers," Statz, Demars, Wilson & Tang, J. Appl. Phys., 36, (5), May 1965, pp. 1510— 14.
Westwater et al., " An Introduction to Servomechanisms," English Univ. Press, (London), 1961, pp. 13— 15.
Giordmaine et al., " Intensity-Induced Optical Absorbtion Cross Section in CS2," Phys. Rev. Lett. 11, (5), 1 Sept. 1963.

*Primary Examiner*—Ronald L. Wibert
*Assistant Examiner*—R. J. Webster
*Attorneys*—Harold A. Murphy and Joseph D. Pannone

ABSTRACT: A laser structure comprising a rod-type lasing element and including means for pumping the element to produce light emission from the ends thereof. Optical means responsive to the light emission create a traveling wave of the light which passes through the rod-type lasing element numerous times to produce a single mode output beam of coherent radiation. A nonlinear light absorber interposed in the single-mode output beam path absorbs large portions of light energy in the traveling wave as the intensity thereof increases. Such arrangement is operative so as to reduce the inherent spiking of the output light beam characteristic.

INVENTOR
HERMANN STATZ

SPIKELESS SINGLE-MODE LASER

This application is a continuation of Ser. No. 546,270, filed Apr. 29, 1966.

This invention was made pursuant to and under a contract with the United States Government.

This invention relates to lasers and has particular reference to laser devices which include means for suppressing spiking in the laser output. More specifically, this invention is concerned with spike suppression in single-mode lasers.

In the normal and well-known manner of operating solid state lasers as well as some gas lasers, spiking in the laser output has been a serious problem. For example, uncontrolled spiking has prevented efficient amplitude modulation. It is desired, therefore, that the output of the laser be stabilized in some manner throughout the fluorescent lifetime of the maser states, that is, the output should be steady and relatively constant during laser action. For ruby, for example, fluorescent lifetime of the maser states is of the order of $5 \times 10^{13}$ seconds. Ruby, like many other solid state materials, is usually pumped by discharges through flashlamps with a typical flash duration of $10^{13}$ seconds. As a result, spiking is typically present during the entire period of laser action.

However, I have discovered that the solution to the spiking problem can be solved by utilizing a single-mode traveling wave laser and inserting a nonlinear absorber in the reflecting cavity thereof to absorb a selected small amount of the oscillating energy, whereupon the desired steady and nearly constant output during laser action is achieved.

In accordance with this invention, I employ a nonlinear multiphoton absorber or an electro-optical device such as a Kerr cell absorber in a single-mode traveling wave laser such as described, for example, in my copending U.S. Pat. application Ser. No. 277,224, filed May 1, 1963. In the structure described in said copending application, an optical isolator is inserted within a loop-type cavity so that output radiation from one end of the ruby or other lasing element will be completely blocked, while output from the other end of the element will be directed back into the element through the opposite end thereof. The isolator in the optical cavity prevents the existence of standing waves, and thus the laser produces a substantially single-mode output.

By utilizing a single-mode output device of this type and inserting within it a nonlinear absorber such as a Kerr cell or multiphoton absorber, I have produced an efficient, utilizable, steady and relatively constant output from a laser throughout the duration of laser action.

It is to be understood that single-mode devices other than the device shown and described in the aforementioned application may be used in connection with this invention. For example, an axially aligned optical-type device may be used which utilizes the Fabry-Perot principle, such as shown and described in U.S. Pat. No. 3,409,843 to Colin Bowness filed Apr. 2, 1964, and assigned to the same assignee as the present invention.

Other objectives and advantages of this invention will become apparent from the following description taken in connection with the accompanying drawings, wherein.

Figure 1:
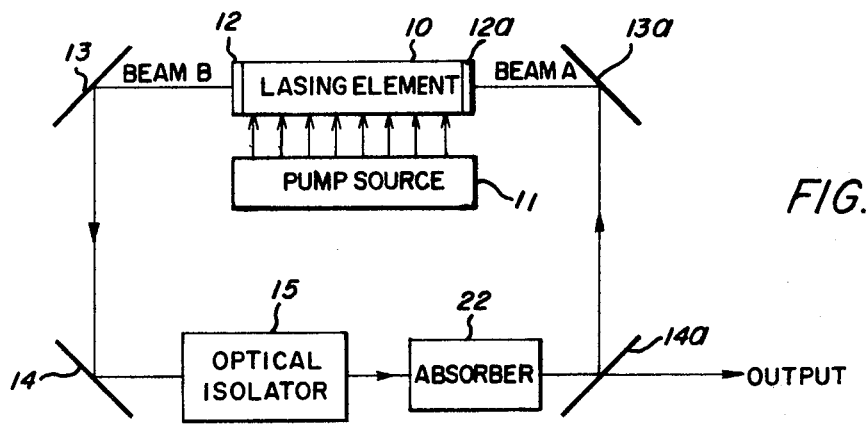
FIG. 1 is a diagrammatic illustration of a single-mode laser embodying the invention.

Referring more particularly to the drawings, in FIG. 1 there is shown a single-mode laser employing a ruby 10 or other negative temperature medium as the active laser element. Ruby 10 is a crystal which is formed by any convenient means well known in the art. However, this output radiation-producing member or rod 10 may comprise any suitable material capable of lasing in the known manner when suitably pumped by pumping radiation from a pump source 11 which may be a flashlamp or tube suitably connected into circuitry (not shown) whereby the lamp may be flashed to emit a bright burst of radiation for a relatively short period of time in the known manner of flash tubes of this type. The pumping radiation from the lamp 11 is transmitted to the lasing element 10, whereupon population inversion of the atom energy levels of the element 10 occurs in the known manner. This causes longitudinal modes of monochromatic radiative energy to begin oscillating within the lasing element 10 and to be emitted from both ends of the element. The element 10 may be provided on both ends, if desired, with reflection reduction coatings 12 and 12a to decrease internal reflection of the stimulated radiation at the ends of the element.

The radiation from the ends of the element 10 will pass as separate beams B and A in opposite directions toward respective reflecting elements 13 and 13a from which they will be directed onto a second of reflecting elements 14 and 14a. The second set of reflecting elements will direct the beams of radiation into an optical isolator 15 which operates to completely block passage of one of the beams while permitting the other beam to continue through and to be reflected back into the lasing element 10 as a traveling wave which is amplified and again passes out of the element and through the system a number of times until finally it escapes through one of the mirrors which has been made partially reflective for this purpose. The optical isolator thus eliminates standing waves and permits the creation of a single-mode output. The theory of single-mode production is clearly set forth in detail in my copending application referred to above. Therefore, it is believed unnecessary to provide additional details of this theory at this time. The reflecting mirrors may be replaced by prisms, if desired, which will effectively transmit the energy in the desired manner.

Figure 2:
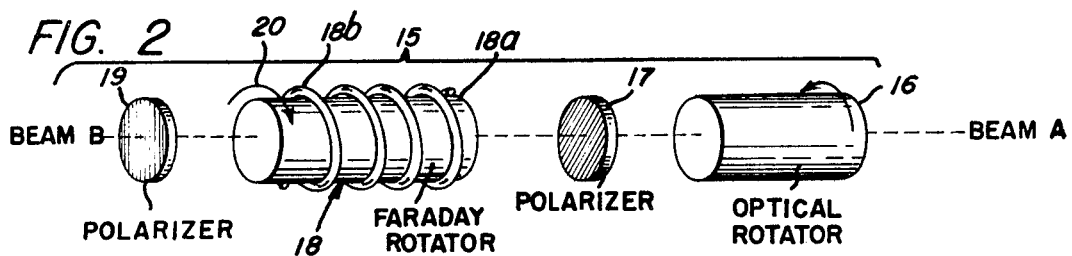
FIG. 2 is an illustration of an optical isolator for providing single-mode laser operation.

The optical isolator 15 is shown in detail in FIG. 2 and comprises an optical rotator 16, a polarizer 17, a Faraday rotator 18, and a second polarizer 19, in that order. The polarizers may be any suitable polarizing material, it being important, however, that they be oriented at 45° with respect to each other. The Faraday rotator 18 is preferably a body of lead oxide glass 18a enclosed within a solenoid coil 18b which is capable of applying an axial field strength of predetermined value whereby it will function to rotate the plane of polarization of the radiation passing through it. For example, such a rotator comprising a body of lead oxide glass approximately 10 centimeters in length has approximately a 0.1 minute/gauss-cm. Faraday rotation at optical frequency. The encircling coil, in such conditions, should be capable of applying a field of strength of approximately 4000 gauss to the rotator body whereupon the plane of polarization of the radiation passing through the body is rotated 45°. The optical rotator 16 may be a standard quartz rotator well known and used in the art and is preferably cut to a length such that incoming plane-polarized light is rotated 45°.

Considering now beam A of radiation exiting from the lasing element 10 through end coating 12a, this beam will be reflected by mirrors 13a and 14a into the isolator 15, first through the quartz rotator 16 where it is substantially unaffected since the beam at this point in its progress is not plane-polarized, then through polarizer 17 where it becomes plane-polarized at an angle which is 45° from the axis of polarization of second polarizer 19. From polarizer 17 the beam passes into Faraday rotator 18 where its plane of polarization is rotated 45° as indicated by arrow 20. Then it passes to polarizer 19 which completely blocks its passage since the plane of polarization of the beam after leaving Faraday rotator 18 is at a 90° angle with respect to the axis of polarization of polarizer 19.

Beam B, however, will be reflected by mirrors 13 and 14 into the isolator 15 and will first be plane-polarized by polarizer 19, then rotated 45° by Faraday rotator 18 in the direction of arrow 20. This will cause its plane of polarization to correspond to the axis of polarization of polarizer 17 through which it passes unattenuated to optical rotator 16 which will rotate its plane of polarization back again. Beam B thus will then be reflected by mirrors 14a and 13a back into the lasing element 10. By this means, standing waves are eliminated and beam B will be transmitted as a traveling wave which passes through the lasing element many times to create stimulated emission which is of a single mode.

The resultant discharge of monochromatic radiation which eventually is emitted through partially reflective mirror 14a consists of a series of spikes which are present during the entire period of laser action, the spikes being dampened out in a regular manner within a time period which is comparable to the fluorescent lifetime of the maser states. For ruby, as an example, this time is of the order of $5 \times 10^{13}$ seconds.

Figure 3:
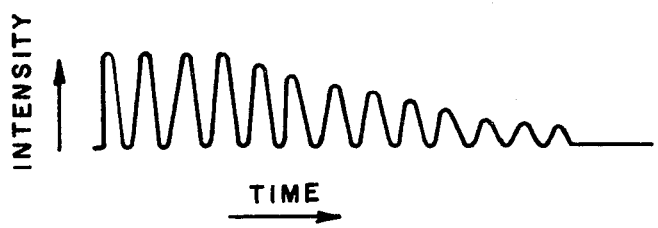
FIG. 3 is a diagram of a single-mode laser output.
Figure 4:
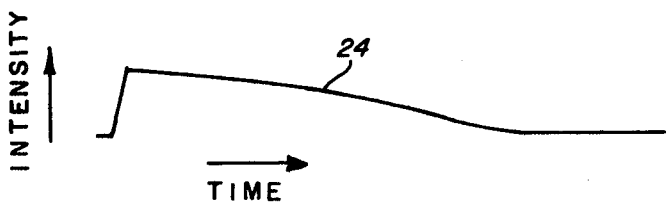
FIG. 4 is a diagram of the output of a device embodying this invention.

The single mode output contains a series of spikes which is quite regular. For example, FIG. 3 illustrates the output of a solid state device as described above when 620 joules is the provided input from the pumping source. An optimum desired output achieved by the invention is illustrated in FIG. 4, and it will be seen that the spikes have been replaced by a much more stable or constant output curve.

Figure 5:
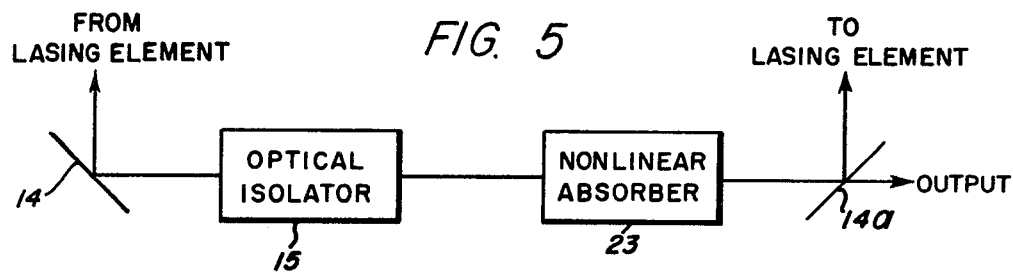
FIG. 5 is a diagram of a portion of the single-mode device of FIG. 1 utilizing a nonlinear multiphoton absorber for elimination of spikes in the output.

A relatively stable and constant output is achieved in accordance with this invention by positioning a nonlinear absorber in the oscillating cavity of a traveling wave single-mode device. By "nonlinear absorber" is meant an optical or electro-optical device through which light passes but which absorbs larger fractions of the light as the intensity of the light increases. Not to be confused with nonlinear absorbers are linear absorbers which always absorb substantially the same percentage of the light regardless of its intensity. In one embodiment of this invention as illustrate in FIG. 1, the absorber 22 is a Kerr cell which commonly comprises nitrobenzene or other of the well-known materials which exhibit the "Kerr effect" when subjected to an applied electric field. In another modification as shown in FIG. 5, the nonlinear absorber is a mass of carbon disulfide or other two-or-more photon absorbing material. In either case, the absorber is a nonlinear lossy material whose power absorption is proportional to the square or some higher power of the electromagnetic energy density.

When using the multiphoton absorber in the traveling wave single-mode laser, it is found that buildup of electromagnetic energy is resisted by the absorber. Spiking is well described by the solution of the conventional normalized rate Equations:

$$\frac{d\pi}{dT} = \frac{1}{Q}(n-1)\pi \quad (1)$$

$$\frac{dn}{dT} = -\frac{n-\alpha}{T_0} + \frac{1-\alpha_{n\pi}}{T_0} \quad (2)$$

In these equations $\pi$ is the normalized electromagnetic energy density, $Q$ is the quality factor of the cavity, $n$ is the normalized inverted population, $t=\omega t$, where $t$ is time and $\omega$ the angular frequency. The term normalized inverted population $n$ relates the excess population of atoms in the excited energy level to the total population of atoms in the system. Thus, if $n_{1'}$ equals the population of atoms in the excited energy state and if $n_{2'}$ is the population of atoms in the ground state, then $$n = \frac{n_{1'} - n_{2'}}{n_1 - n_2}$$

In the limit when total inversion occurs the ground state is entirely empty. The inversion ratio, however, can never exceed unity and is, therefore, less than one for all real systems. Similarly, $T_0 = \omega t_0$, where $t_0$ is approximately the fluorescent lifetime. The quantity $\alpha$ is a measure of the pump intensity. It indicates the value which $n$ would approach due to the pump in the absence of stimulating radiation. The steady-state solutions of Equations (1) and (2) are $n=1$ and $\pi=1$.

In accordance with the present invention, there is provided a modification in the response of the electromagnetic cavity by inserting a loss term which increases more than linearly with the electromagnetic energy density. In particular, Equation (1) is changed to:

$$\frac{d\pi}{dT} = \frac{1}{Q}(n - 1 - \epsilon\pi^n + \epsilon)\pi$$

In Equation (3), $\pi$ is the added loss term where $\epsilon \ll 1$. Adding the constant $\epsilon$ in the parenthesis changes the definition of $Q$ slightly in order to retain the normalization of the steady-state solution to $\pi=1$ and $n=1$. By inserting into Equations (3) and (2)

$$n = 1+u \quad , \quad \pi = 1+v \quad (4)$$

and neglecting all terms in $u$ and $v$ which are of second and higher order, we obtain $$\frac{dv}{dT} = \frac{1}{Q}(u - \epsilon nv)$$

$$\frac{du}{dT} = \frac{u}{T_0} - \frac{\alpha-1}{T_0}(v+u)$$

These Equations (5) and (6) can be solved in the usual way by assuming $$v = a \exp \beta T \quad , \quad u = b \exp \beta T \quad (7)$$

Inserting Equation (7) into Equations (5) and (6), results in a system of linear homogenous equations for $a$ and $b$ which have only a nontrivial solution if the determinant of the coefficients vanishes. By setting this determinant equal to zero, there is obtained a quadratic equation for $\beta$ which has the solutions:

$$\beta = -\frac{1}{2}\left(\frac{n\epsilon}{Q} + \frac{\alpha}{T_0}\right) \pm \sqrt{\frac{1}{4}\left(\frac{n\epsilon}{Q} + \frac{\alpha}{T_0}\right)^2 - \frac{1}{QT_0}(\alpha - 1 + \epsilon n \alpha)}$$

Now assuming $T_0 = 6 \times 10^{12}$, $Q = 3 \times 10^7$, $\alpha = 2$, $n=1$, $\epsilon \approx 10^{-2}$, which are the values which approximately correspond to satisfactorily performed experiments, and obviously neglecting $\alpha/T_0$ in comparison to $n\epsilon/Q$, and $\epsilon n\alpha$ in comparison to $\alpha-1$, it is proved that spiking is aperiodically damped when the quantity under the square root in Equation 8) becomes positive or when $$\epsilon n > 2\sqrt{(\alpha-1Q/T_0)}$$

For this example, this means $\epsilon n > 4.47 \times 10^{13}$, which in turn means that in order to completely suppress all spikes a two-photon absorber will have to account for 0.44 percent of all losses at steady-state operating conditions.

It has been found that with electro-optical nonlinear absorbers there will be a time delay in the response of the intensity-dependent loss term $\epsilon\pi^n$ from the instantaneous energy density $\pi$ due to electronic control mechanism acting on the voltage applied to a Kerr cell. This time delay is quite important in the determination of the spiking behavior of the laser due to the electronic mechanism acting on the voltage applied to the Kerr cell or other electro-optical absorber. To include this time delay in the analysis, the nonlinear rate Equation (3) must be modified as follows:

$$\frac{d\pi(T)}{dT} = \frac{1}{Q}n(T)[n(T) - 1 - \epsilon\pi^n(T-\tau)] \quad (9)$$

where $\pi(T-\tau)$ *designates the value of* $\pi$ *at the time* $T-\tau$ *to account for the delay*, $\tau = \omega x$ (the delay time), in the response of the intensity-dependent loss term from the instantaneous energy density $\pi(T)$. In Equation (9), the constant $\epsilon$ term of Equation (3) has been dropped since it is always much less than one. In the same manner Equation (2) becomes $$\frac{dn(T)}{dT} = -\frac{n(T) - \alpha}{T_0} + \frac{1-\alpha}{T_0}n(T)\pi(T) \quad (10)$$

With use of a nonlinear multiphoton optical absorber 23, an output closely approximating curve 24 in FIG. 4 is obtained.

Figure 6:
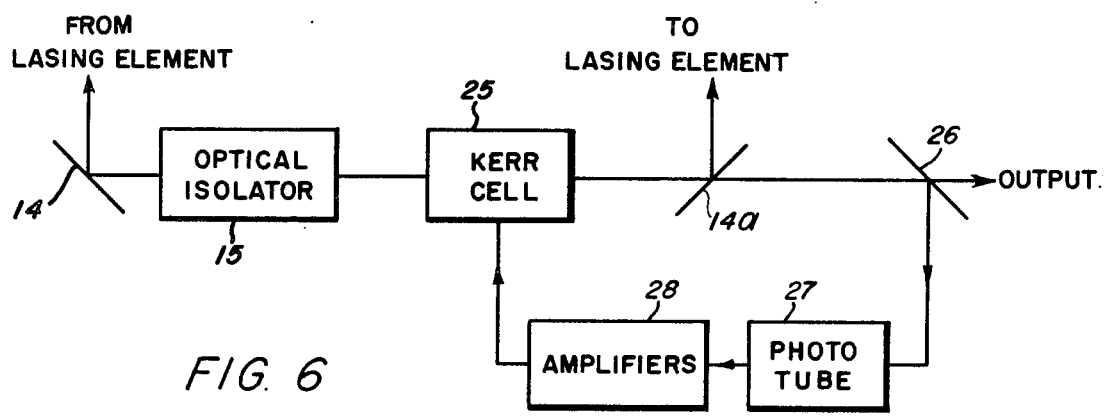
FIG. 6 is a diagram similar to FIG. 5 wherein a nonlinear absorber in the form of a Kerr cell and feedback circuit are employed to eliminate spikes.

Such an output curve 24 is also closely achieved by employing an electrooptical absorber such as the Kerr cell 25 with a feedback control circuit as shown in FIG. 6. In this embodiment of the invention, the traveling wave radiation from the lasing element will pass through the optical isolator 15 and the Kerr cell 25, and also a portion of it will pass through the partially reflecting mirror 14a onto a second mirror 26 which is partially reflective. Mirror 26 will direct reflected radiation into a phototube 27 of any well-known kind which creates an electrical signal in response to incident radiation. The signal from phototube 27, which signal is of a value which corresponds to the density of the radiation impinging upon phototube 27, is amplified in area 28 and passed on to the coil or solenoid of the Kerr cell 25. Thus, the Kerr cell 25 will absorb density in amounts controlled by the signal from the phototube. For example, if the Kerr cell initially absorbs a selected percentage of the beam passing through it, as the density of radiation builds up during continued oscillation of the laser system the feedback loop will constantly and continually adjust the Kerr cell. Thus, a greater percentage of absorption takes place with increased density so that a constant output is obtained. That is, the attenuation of the laser light in the cavity contains a term which is proportional to the voltage on the Kerr cell 25, and this voltage is in turn proportional to the phototube output which senses the laser output. There is, however, a definite loss in the circuit from the laser output due to the finite speed-of-response of the feedback control circuit. The minimum total delay in the circuit is about 0.4 microsecond, corresponding to $\tau \approx 10^9$. The attenuation of light by the Kerr cell is approximately 2 to 3 percent for a Kerr cell voltage of 4 kv. In order to reach the active region of the Kerr cell, a bias of about 0.5 kv. is needed.

It is to be understood, of course, that the output curve representing the finally produced monochromatic beam of radiation will vary somewhat with changes in values of delay time in the feedback signal and various pumping levels of the laser.

Figure 7:
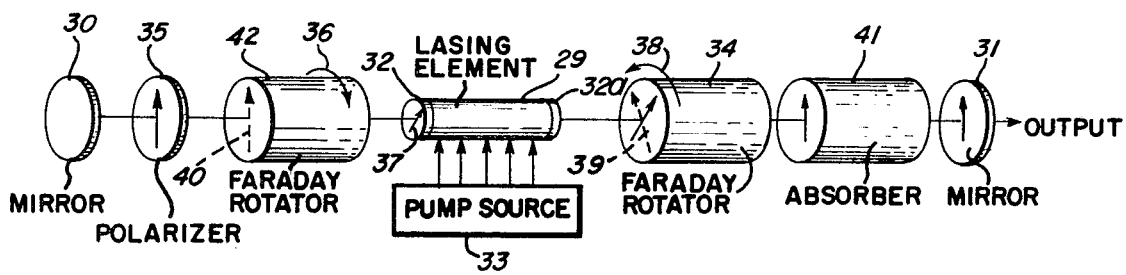
FIG. 7 is a diagrammatic illustration of another type of single-mode laser embodying the invention.

While the invention has been described above as applied to a loop-type cavity traveling wave single-mode laser, it will be apparent that it may be applied to several other types of single-mode lasers such as the device shown in FIG. 7, for example. In this structure, the lasing element or rod 29 is aligned in a cavity of the Fabry-Perot type within a pair of mirrors 30 and 31, mirror 31 being partially reflective to permit exit of the resultant output beam of monochromatic radiation. The ends of element 29 are preferably provided with suitable reflection reduction coatings 32 and 32a respectively. Pumping radiation from source 33 enters rod 29 and population inversion of the atom energy levels occurs in the rod in the known manner. Radiative energy begins oscillating within the rod and is emitted from the rod at both ends. Adjacent each end of the rod are Faraday rotators 42 and 34 respectively and opposite each rotator are respective mirrors 30 and 31. Each rotator comprises a cylinder of, for example, lead oxide glass positioned within encircling coils. All of the optical elements are aligned on a common optical axis and a polarizer 35 is inserted in the system between one of the rotators 42 or 34 and the adjacent mirror. In FIG. 7, the polarizer 35 is shown positioned between rotator 42 and mirror 30, but it can as well be located between rotator 34 and mirror 31.

Considering first the energy or radiation emitted from coated end 32 of rod 29, this energy passes through Faraday rotator 42 which rotates the electric vectors 45° in the direction of arrow 36. The light or energy then passes through polarizer 35 where it is plane-polarized, and impinges upon mirror 30, then is reflected back through polarizer 35 unchanged and enters the Faraday rotator 42 as plane-polarized light where its plane of polarization is rotated 45° so as to enter rod 29 polarized in the plane indicated by arrow 37. This light then passes through rod 29 and enters rotator 34 which will rotate its plane of polarization back 45° as shown by arrow 38, at which angle or plane it will impinge upon and be reflected back by mirror 31. Reflected light from the mirror 31 will reenter Faraday rotator 34 and will emerge with its plane of polarization rotated as indicated by dotted arrow 39. This light will then reenter rod 29 and pass through unchanged as to polarization orientation, and will again pass through rotator 42 and be rotated to the plane shown by dotted arrow 40. This process is repeated a large number of times as oscillation continues.

It is to be understood that light initially emitted from coated end 32a of the rod after plane-polarization will be rotated and transmitted similarly to light from end 32. In this way there is achieved a cavity which has the desirable property that no standing waves exist within the active laser material. Of course, the polarizer may be replaced by a transparent member which is disposed in the system at a predetermined angle to the axis of the system to completely linearly polarize the light reflected therefrom in accordance with Brewster's theory. The coils for the Faraday rotators are connected to a suitable external source of energy as desired.

In accordance with this invention, the traveling wave single-mode laser shown in FIG. 7 is provided with a nonlinear absorber 41 at any location in the system, preferably adjacent the partially transparent output mirror 31. This nonlinear absorber may be a multiphoton absorber or an electro-optical device such as a Kerr cell absorber which functions as described hereinbefore. It is to be understood that a Kerr cell absorber will require a feedback control circuit which is not shown in FIG. 7 but which is of the type illustrated in FIG. 6. Thus, there will be produced an output beam of monochromatic electromagnetic radiation which is relatively stable and constant, without the undesired spikes.

From the foregoing it will be apparent that there has been achieved an improved laser output which is relatively stable and constant, being free of the undesirable spiking which is inherent in prior art devices. It is to be understood that, in addition to solid state lasers, the invention is applicable to gas or other lasers which have long fluorescent lifetimes, for example, carbon dioxide and other gases or gas combinations.

I claim:

1. A laser structure for eliminating spiking comprising:
    a rod-type element;
    means for pumping said element to produce light emission from the ends thereof which may include spikes;
    optical means including an optical isolator for creating a travelling wave of said light which passes through said lasing element a number of times to produce a single-mode output beam of coherent electromagnetic radiation; and
    a passive light absorber having a nonlinear input-output characteristic interposed in the single-mode output beam path for passively absorbing larger fractions of light energy in said travelling wave and for suppressing the oscillation level of substantially all frequencies in said spikes as the intensity of said beam increases.

2. A laser structure in accordance with claim 1, wherein said passive light absorber is a nonlinear lossy material, the power absorption of which is proportional to at least the square of the electromagnetic energy density.

3. A laser structure in accordance with claim 2, wherein said passive light absorber comprises one of the materials selected from the group consisting of nitrobenzene and carbon disulfide.

4. In combination:
    an element for generating radiation by stimulated emission;
    means for pumping said element to produce stimulated electromagnetic radiation emission from said element;
    means for causing said radiation to pass through said element a number of times and for producing an output beam of coherent electromagnetic radiation; and
    a passive absorber having a nonlinear broadband absorption input-output characteristic interposed in the output beam path for passively absorbing larger fractions of energy in said beam and for suppressing the oscillation level of substantially all frequencies in said spikes as the intensity of said beam increases.

5. A combination in accordance with claim 4, further including an isolator interposed in the path of said electromagnetic radiation for the elimination of standing waves with resultant single-mode propagation characteristics.

6. A combination in accordance with claim 5, wherein said radiation is travelling wave radiation.

UNITED STATES PATENT OFFICE
CERTIFICATE OF CORRECTION

Patent No. 3,584,312          Dated June 8, 1971

Inventor(s) Hermann Statz

It is certified that error appears in the above-identified patent and that said Letters Patent are hereby corrected as shown below:

IN THE SPECIFICATION

Column 1, line 19, change "$5 \times 10^{13}$" to -- $5 \times 10^{-3}$ --

Column 1, line 22, change "$10^{13}$" to -- $10^{-3}$ --

Column 2, line 25, after "second" insert -- set --

Column 2, line 56, omit "of" (first occurrence)

Column 3, line 21, change "$5 \times 10^{13}$" to -- $5 \times 10^{-3}$ --

Column 3, line 60, change "$I = \omega t,$" to -- $T = \omega t,$ --

Column 4, lines 10 and 11, after the equation insert -- (3) --

Column 4, lines 21 and 22, after the equation insert -- (5) --

Column 4, lines 24 and 25, after the equation insert -- (6) --

Column 4, lines 38 and 39, after the equation insert -- (8) --

IN THE CLAIMS

Column 6, line 40, Claim 1, after "rod-type" insert -- lasing --

Signed and sealed this 13th day of June 1972.

(SEAL)
Attest:

EDWARD M. FLETCHER, JR.
Attesting Officer

ROBERT GOTTSCHALK
Commissioner of Patents